(12) United States Patent
Horng et al.

(10) Patent No.: US 6,882,074 B2
(45) Date of Patent: Apr. 19, 2005

(54) AXIAL TUBE ASSEMBLY FOR A MOTOR (75) Inventors: Alex Horng, Kaohsiung (TW); Yin-Rong Hong, Kaohsiung (TW); Ching-Sheng Hong, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 38 days.

(21) Appl. No.: 10/677,234

(22) Filed: Oct. 3, 2003

(65) Prior Publication Data
US 2005/0052089 A1 Mar. 10, 2005

(51) Int. Cl.[7] .............................. H02K 5/16; H02K 7/08
(52) U.S. Cl. ........................................ 310/90; 310/91
(58) Field of Search ................................ 310/90, 91

(56) References Cited

U.S. PATENT DOCUMENTS 5,343,104 A * 8/1994 Takahashi et al. ............ 310/90
6,246,140 B1 * 6/2001 Horng ........................... 310/91
6,734,591 B1 * 5/2004 Obara et al. .................. 310/90

* cited by examiner

Primary Examiner—Burton Mullins
(74) Attorney, Agent, or Firm—Bacon & Thomas, PLLC (57) ABSTRACT An axial tube assembly for a motor includes an axial tube and a sleeve mounted in the axial tube. The axial tube is securely mounted to a casing, and a stator is mounted to the axial tube. When a bearing is mounted in the sleeve, the sleeve is tightly engaged with the axial tube such that the axial tube and the bearing exert forces to each other to thereby retain the axial tube and the bearing in place.

18 Claims, 10 Drawing Sheets

AXIAL TUBE ASSEMBLY FOR A MOTOR

BACKGROUND OF THE INVENTION

1. Field of the Invention

The present invention relates to an axial tube assembly for a motor. In particular, the present invention relates to an axial tube assembly for reliably positioning a bearing of a motor. The present invention also relates to a motor having such an axial tube assembly.

2. Description of Related Art

Figure 1:
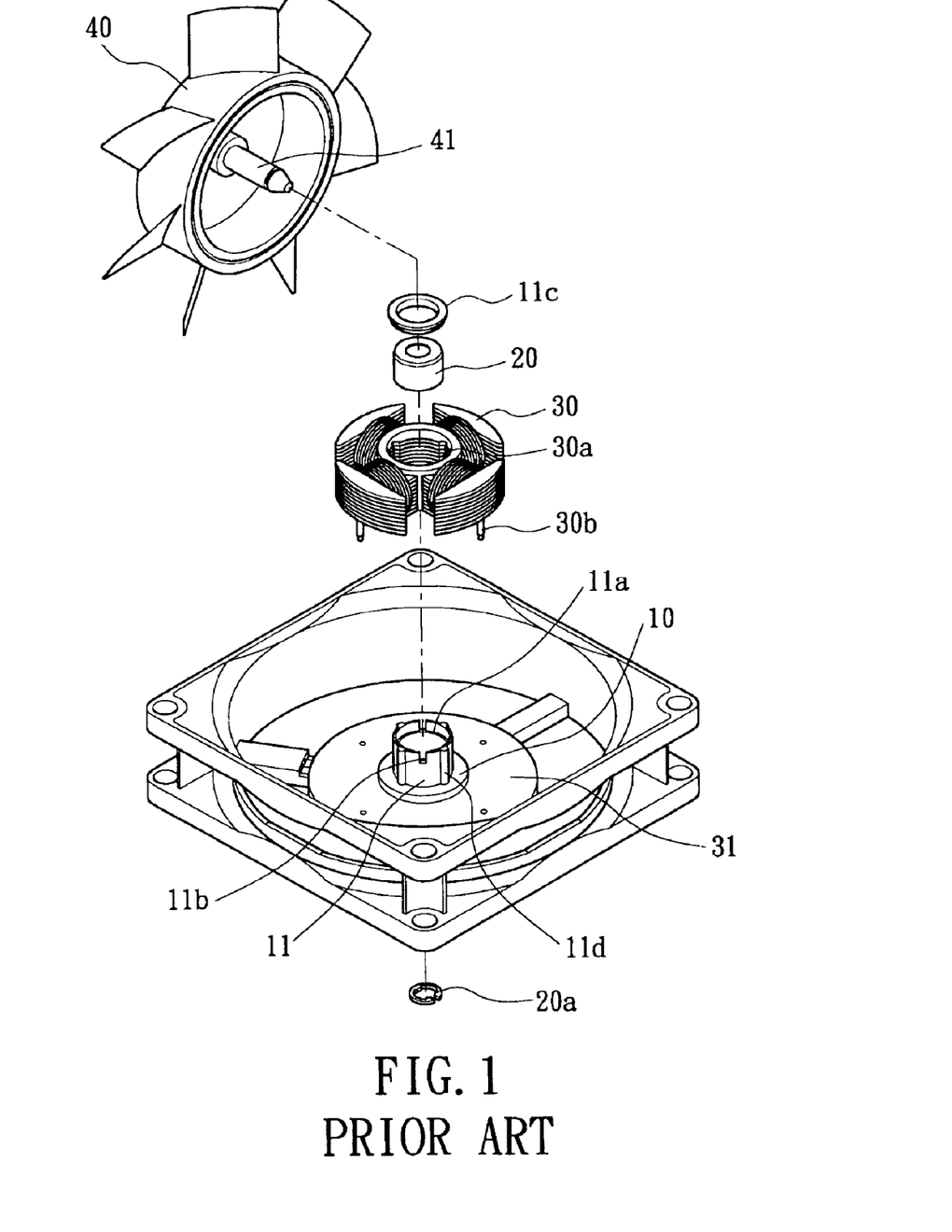
FIG. 1 is an exploded perspective view of a conventional motor.
Figure 2:
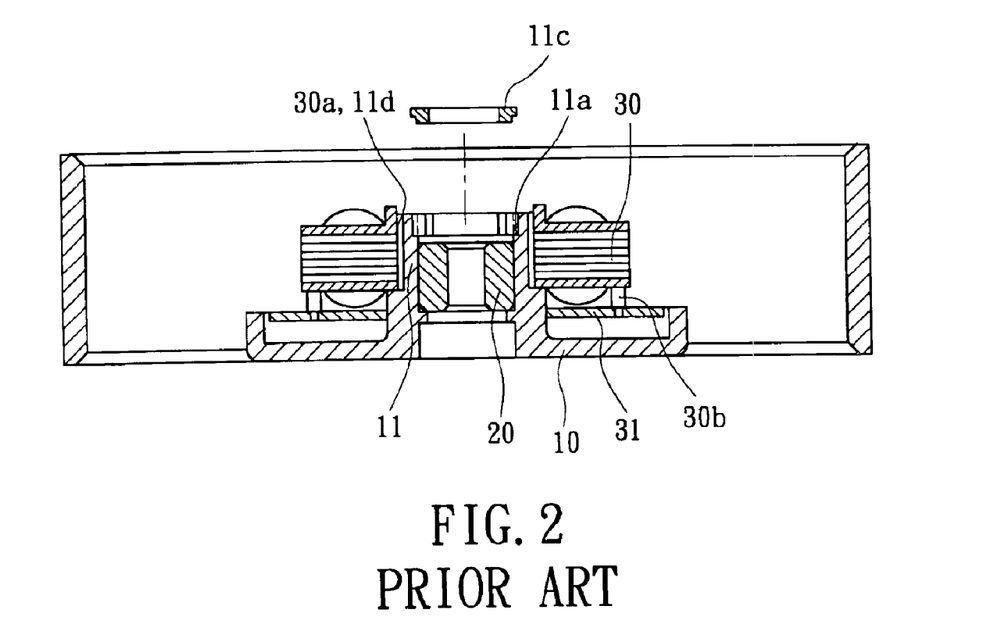
FIG. 2 is a sectional view of the conventional motor in FIG. 1.

FIGS. 1 and 2 of the drawings illustrate a conventional motor including a casing 10, a bearing 20, a stator 30, a circuit board 31, and a rotor 40. The casing 10 includes an axial tube 11 integrally formed on a central portion of the casing 10. The axial tube 11 includes a stepped portion 11a on an inner periphery thereof and a plurality of longitudinal slits 11b in a top end thereof. The slits 11b allow the axial tube 11 to expand radially outward. After the bearing 20 is mounted into the axial tube 11, a retaining cap 11c is mounted to the stepped portion 11a to improve assembling reliability, and a shaft 41 of the rotor 40 is then extended through the retaining cap 11c and the bearing 20. Further, at least one rib 1d is formed on an outer periphery of the axial tube 11 for engaging with at least one groove 30a in a longitudinal hole of the stator 30 to provide a reliable positioning for the stator 30. Further the stator 30 includes a plurality of legs 30b engaged with the circuit board 30. After assembly, the retaining cap 11c urges the top end of the axial tube 11 to expand radially outward, thereby preventing the stator 30 from being disengaged from the axial tube 11.

The above-mentioned motor has a simple structure that is easy to assemble and that has a low manufacturing cost. However, the assembling reliability of the motor is low, as the retaining cap 11c is the only member for maintaining the positional relationships among the bearing 20, the stator 30, and the circuit board 31. Further, in a case that the axial tube 11 and the bearing 20 have a relatively large tolerance therebetween, the bearing 20 is apt to rotate together with the shaft 41 of the rotor 40. Further, coaxiality of the axial tube 11, the bearing 20, and the shaft 41 of the rotor 40 could not be achieved, as the bearing 20 is directly engaged in the axial tube 11 without any positioning assistance. As a result, the rotational stability is adversely affected, resulting in imbalanced rotation and generation of noise. Further, since there is no means for preventing the retaining cap 11c from being disengaged from the axial tube 11, the shaft 41 might shake and thus cause a retainer ring 20a mounted to a distal end of the shaft 41 to exert an axial force to the bearing 20 and the retaining cap 11c, causing disengagement of the bearing 20 and the retaining cap 11c from the axial tube 11. Further, a relatively large gap exists between the axial tube 11 and the rotor 40 such that dusts in the air current might enter and thus contaminate the lubricating oil in the bearing 20. The speed of the rotor 40 is thus lowered, and the life of the motor is shortened.

OBJECTS OF THE INVENTION

An object of the present invention is to provide an axial tube assembly for a motor for reliably positioning a bearing of the motor.

Another object of the present invention is to provide an axial tube assembly for a motor for reliably positioning a stator of the motor.

A further object of the present invention is to provide an axial tube assembly for a motor for prolonging the life of the bearing of the motor.

Still another object of the present invention is to provide an axial tube assembly for a motor for improving rotational stability of the rotor of the motor.

Yet another object of the present invention is to provide a motor having such an axial tube assembly.

SUMMARY OF THE INVENTION

In accordance with one aspect of the invention, an axial tube assembly for a motor is provided and includes an axial tube and a sleeve mounted in the axial tube. The axial tube is securely mounted to a casing, and a stator is mounted to the axial tube. When a bearing is mounted in the sleeve, the sleeve is tightly engaged with the axial tube such that the axial tube and the bearing exert forces on each other to thereby retain the axial tube and the bearing in place.

In accordance with another aspect of the invention, a motor is provided and includes a casing, an axial tube securely mounted to the casing, a stator mounted to the axial tube, a sleeve mounted in the axial tube, and a bearing mounted in the sleeve. The sleeve is tightly engaged with the axial tube such that the axial tube and the bearing exert forces to each other to thereby retain the axial tube and the bearing in place.

Other objects, advantages and novel features of this invention will become more apparent from the following detailed description when taken in conjunction with the accompanying drawings.

DETAILED DESCRIPTION OF THE PREFERRED EMBODIMENTS

Preferred embodiments of the present invention are now to be described hereinafter in detail, in which the same } reference numerals are used in the preferred embodiments for the same parts as those in the prior art to avoid redundant description.

Figure 3:
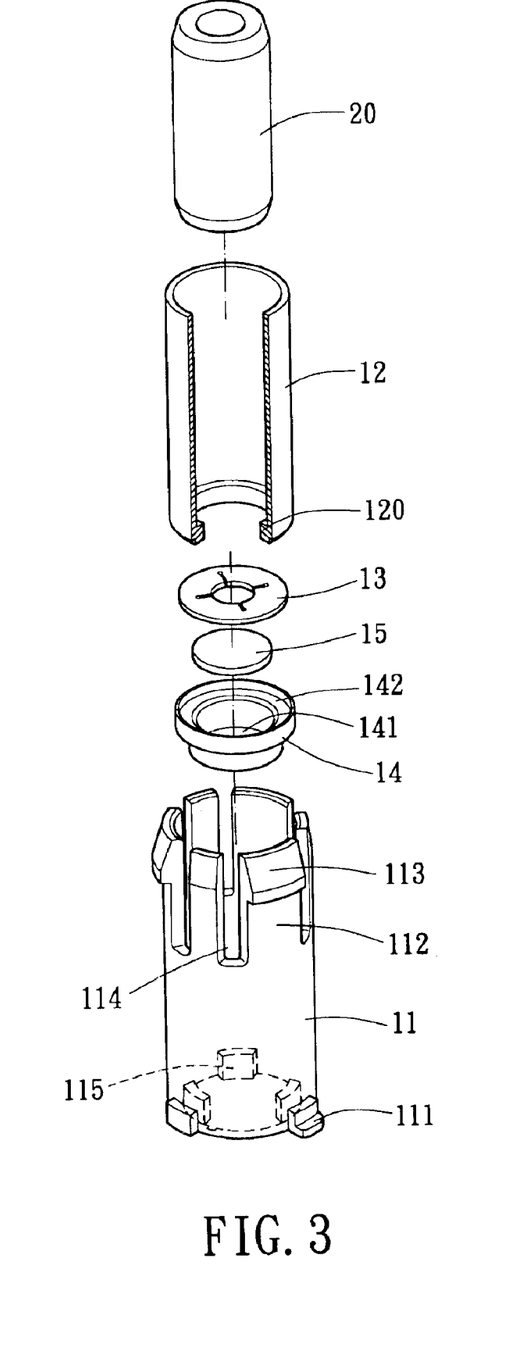
FIG. 3 is an exploded perspective view of a first embodiment of an axial tube assembly for a motor in accordance with the present invention.
Figure 4:
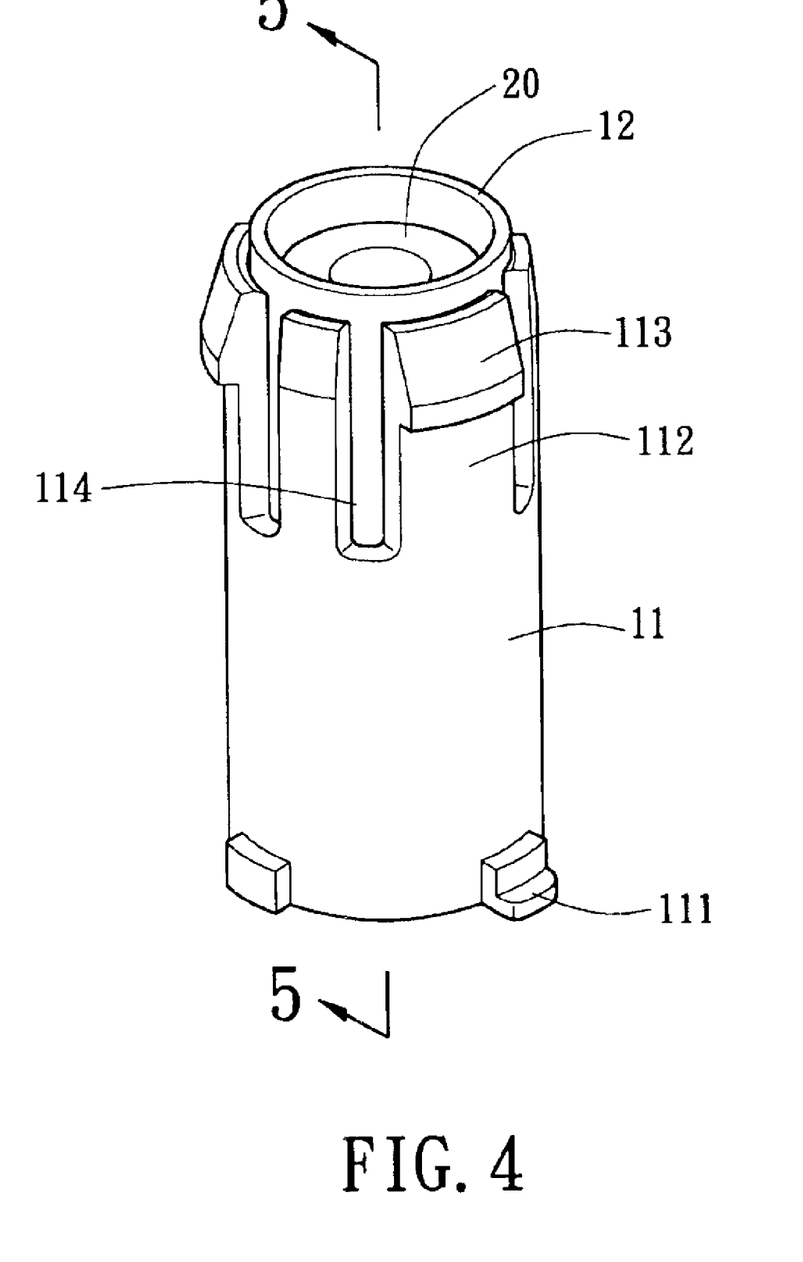
FIG. 4 is a perspective view of the first embodiment of the axial tube assembly for a motor in accordance with the present invention.
Figure 5:
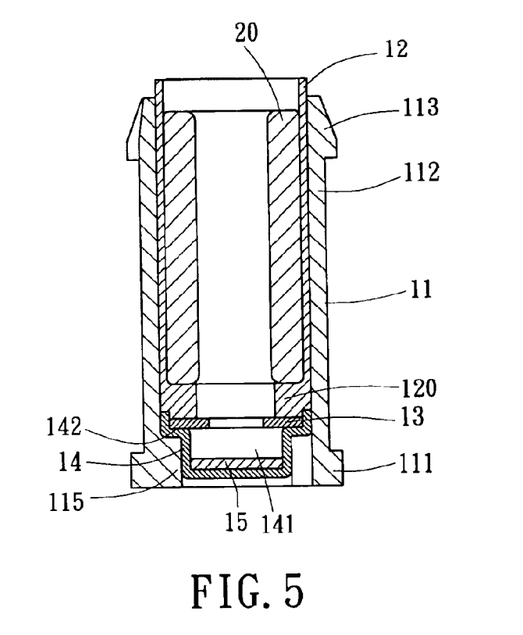
FIG. 5 is a sectional view taken along plane 5—5 in FIG. 4.

Referring to FIGS. 3 through 5, a first embodiment of an axial tube assembly for a motor in accordance with the present invention includes an axial tube 11 and a sleeve 12. The axial tube 11 can be mounted to a casing 10 and engaged with a bearing 20, a stator 30, a circuit board 31, and a rotor 40, thereby forming a motor, as shown in FIG. 6.

The axial tube 11 is preferably made of a plastic material and includes plurality of engaging blocks 111 on a lower end of an outer periphery thereof. A plurality of protrusions 115 are formed on a lower end of an inner periphery of the axial tube 11. Preferably, the protrusions 115 are spaced by regular intervals and symmetrically disposed. Further, a plurality of longitudinal slits 114 are defined in an upper end of the axial tube 11, thereby forming a plurality of resilient tabs 112 on the upper end of the axial tube 11, with each resilient tab 112 having a hook 113 on an outer side thereof. The respective resilient tab 112 possesses required resiliency to move radially inward or outward due to provision of the longitudinal slits 114.

Figure 6:
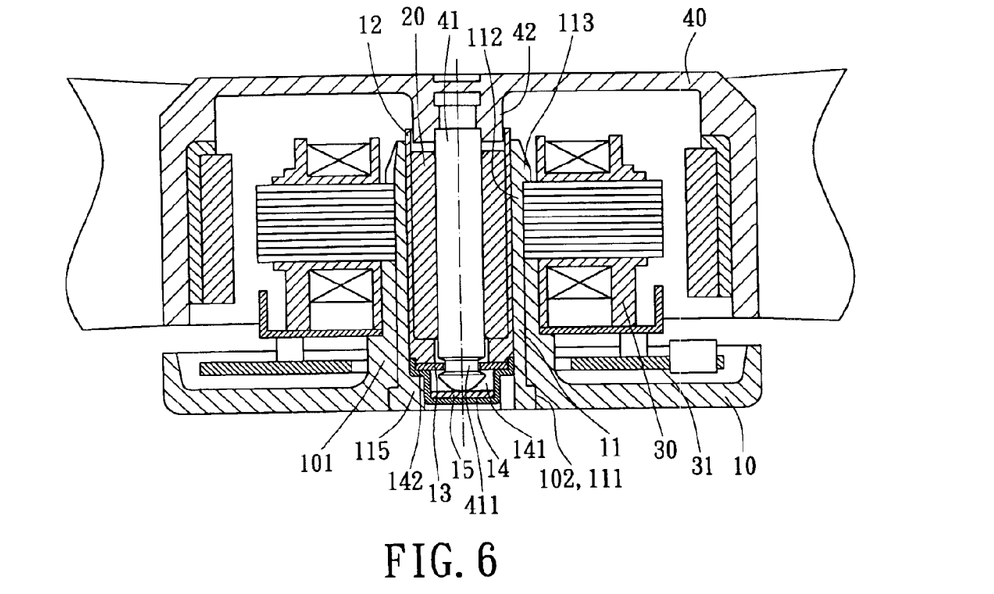
FIG. 6 is a sectional view of a motor with the first embodiment of the axial tube assembly for a motor in accordance with the present invention.
Figure 7:
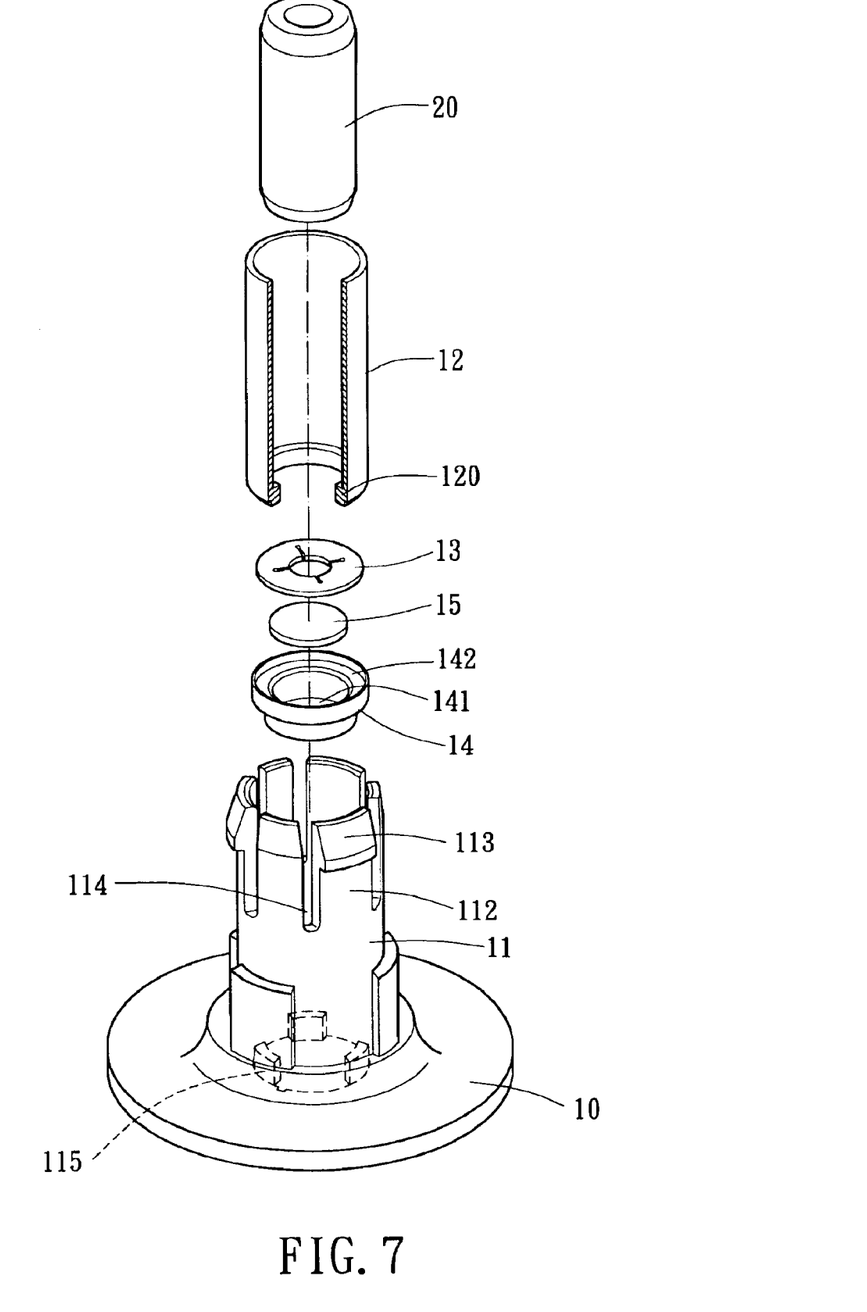
FIG. 7 is an exploded perspective view of a second embodiment of the axial tube assembly for a motor in accordance with the present invention.
Figure 8:
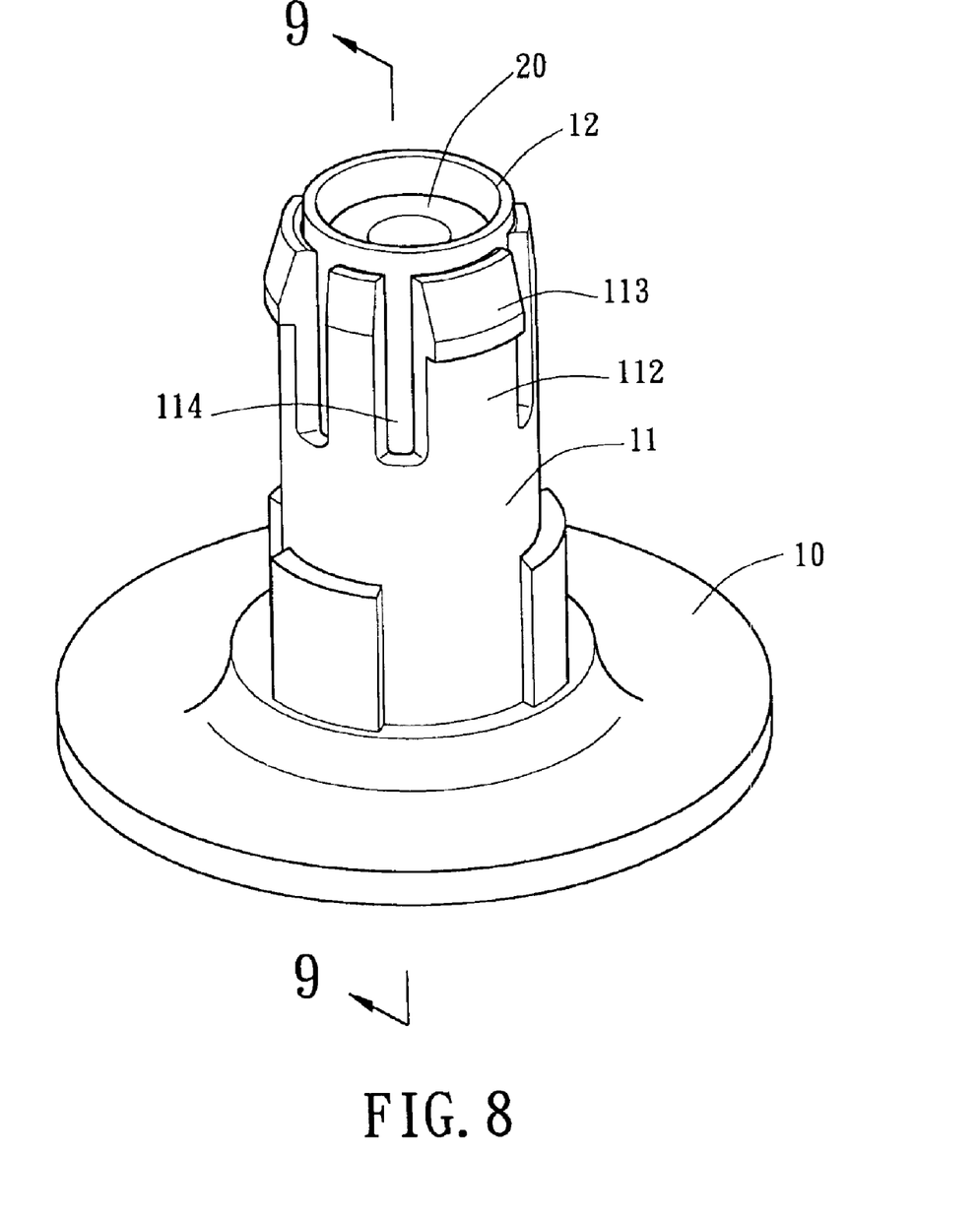
FIG. 8 is a perspective view of the second embodiment of the axial tube assembly for a motor in accordance with the present invention.
Figure 9:
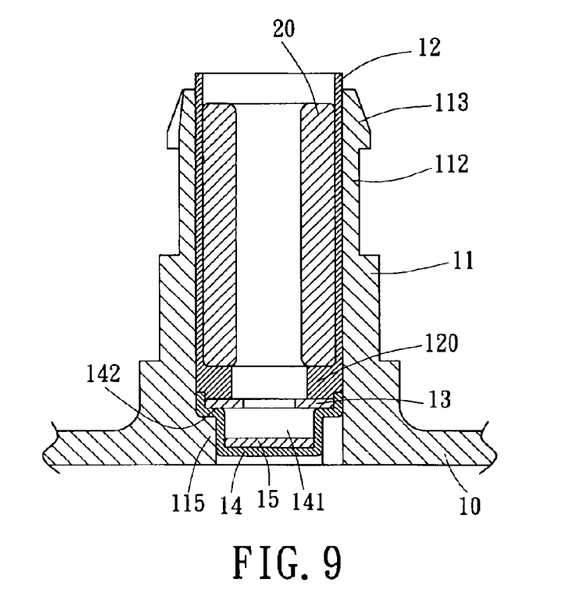
FIG. 9 is a sectional view taken along plane 9—9 in FIG. 8.
Figure 10:
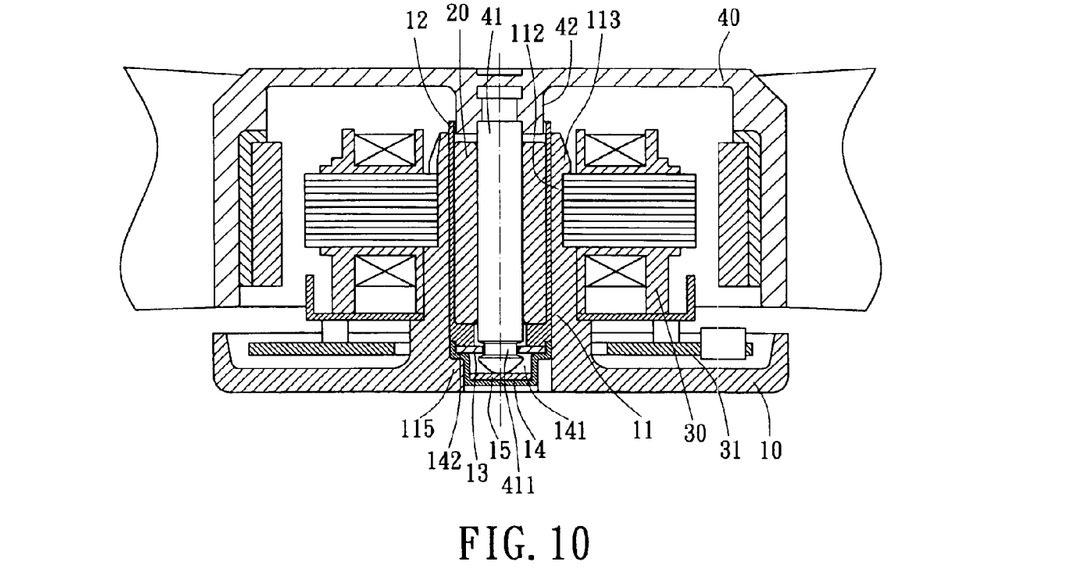
FIG. 10 is a sectional view of a motor with the second embodiment of the axial tube assembly for a motor in accordance with the present invention.

As illustrated in FIG. 6, when the axial tube 11 is mounted into a hollow tube 101 on the casing 10, the engaging blocks 111 are respectively and securely engaged in a plurality of engaging grooves 102 defined in a lower end of the hollow tube 101, thereby preventing relative rotation between the axial tube 11 and the casing 10. The respective block 111 and the respective engaging groove 111 may have a corresponding geometric shape, such as elongated or L-shaped.

The sleeve 12 is preferably made of a plastic material and includes a bottom end having an inner flange 120. Referring to FIGS. 5 and 6, after assembly, the sleeve 12 is tightly engaged in the axial tube 11, preventing relative rotation between the sleeve 12 and the axial tube 11.

Still referring to FIGS. 3 through 6, the axial tube assembly may further include a positioning ring 13 engaged in an annular groove 411 in a distal end of a shaft 41 of the rotor 40, thereby preventing the shaft 41 from being disengaged from the bearing 20 along an upward direction. The axial tube assembly may further include a supporting member 14 having a compartment 141 and a stepped portion 142. An abrasion-resisting plate 15 and lubricating oil are received in the compartment 141, and the stepped portion 142 provides a support for the positioning ring 13.

In assembly, the stator 30 and the circuit board 31 that are engaged together are mounted to the hollow tube 101 of the casing 10, and the axial tube 11 is then mounted into the hollow tube 101 from a bottom end of the hollow tube 101. As illustrated in FIG. 6, the respective engaging block 111 of the axial tube 11 is securely engaged in the engaging groove 102 of the casing 10, thereby preventing relative rotational movement between the axial tube 11 and the casing 10. Further, the hook 113 on the respective resilient tab 112 is compressed radially inward and passes through the hollow tube 101 and the stator 30. After passing the stator 30, the hook 113 on the respective resilient tab 112 returns to its initial position by the resiliency of the respective resilient tab 112, with the hook 113 on the respective resilient tab 112 being engaged with an end edge delimiting a longitudinal hole (not labeled) of the stator 30. The stator 30 and the circuit board 31 are thus retained in place.

Next, the positioning ring 13, the supporting member 14, and the abrasion-resisting plate 15 are mounted into the axial tube 11. The bearing 20 is then mounted into the sleeve 12, which, in turn, is inserted into and thus tightly engaged in the axial tube 11. The positioning ring 13, the supporting member 14, and the abrasion-resisting plate 15 are reliably sandwiched between the flange 120 of the sleeve 12 and the protrusions 115 of the axial tube 11. The shaft 41 of the rotor 40 is then extended through the bearing 20 and the positioning ring 13, with the distal end of the shaft 14 resting on the abrasion-resisting plate 15, which, in turn, is supported by a bottom end of the supporting member 14. It is noted that the positioning ring 13 is engaged in the annular groove 411 in the distal end of the shaft 41 in a manner not adversely affecting rotation of the shaft 41, which is conventional and therefore not described in detail.

As illustrated in FIG. 6, since the sleeve 12 and the axial tube 11 exert forces to each other, the sleeve 12 is tightly engaged with the bearing 20 and thus retains the bearing 20 in place. The respective resilient tab 112 of the axial tube 11 expands radially outward and is thus securely engaged with the stator 30. The stator 30 is thus reliably positioned. Further, since the sleeve 12 and the axial tube 11 have a sufficient tight engagement therebetween, the sleeve 12 is prevented from rotating relative to the axial tube 11. Further, disengagement of the sleeve 12, the positioning ring 13, the supporting member 14, and the abrasion-resisting plate 15 from the axial tube 11 along an upward direction is avoided. Further, due to provision of the sleeve 12, even if the axial tube 11 has a large tolerance, the sleeve 12 allows the bearing 20 to be tightly engaged in the axial tube 11. Thus, the assembling reliability and stability of the bearing 20 and the stator 30 are improved. As a result, the rotational stability of the rotor 40 is improved, and generation of noise resulting from imbalanced rotation of the rotor 40 is avoided.

Further, as illustrated in FIG. 6, an upper end of the sleeve 12 may extend upward to a position adjacent to a hub 42 of the rotor 40 to which the other end of the shaft 41 is mounted. This reduces the gap between the sleeve 12 and the rotor 40, avoiding entrance of dusts into the bearing 20. The life of the bearing 20 is thus prolonged. The bearing 20 may be an oily bearing, self-lubricating bearing, copper bearing, or sintered bearing. The compartment 141 may receive lubricating oil for prolonging the life of the bearing 20.

FIGS. 7 through 10 illustrate a second embodiment of the invention, wherein the axial tube 11 in this embodiment is directly integrally formed on the casing 10 to reduce the number of elements without adversely affecting the tight engagement between the axial tube 11 and the sleeve 12. The assembling reliability and stability of the bearing 20 and the stator 30 are improved. As a result, the rotational stability of the rotor 40 is improved, and generation of noise resulting from imbalanced rotation of the rotor 40 is avoided. Similar to the first embodiment, the upper end of the sleeve 12 in the second embodiment may extend upward to a position adjacent to the hub 42 of the rotor 40 to reduce the gap between the sleeve 12 and the rotor 40, avoiding entrance of dusts into the bearing 20. The life of the bearing 20 is thus prolonged.

Figure 11:
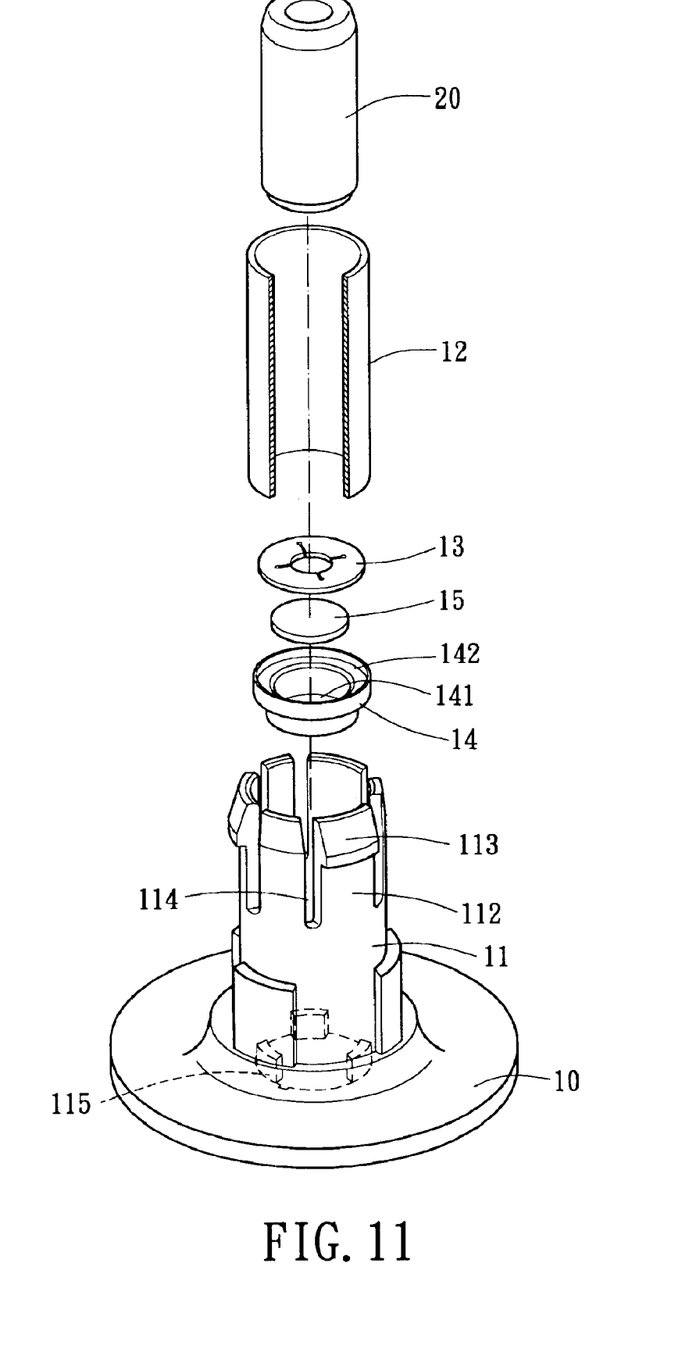
FIG. 11 is an exploded perspective view of a third embodiment of the axial tube assembly for a motor in accordance with the present invention.
Figure 12:
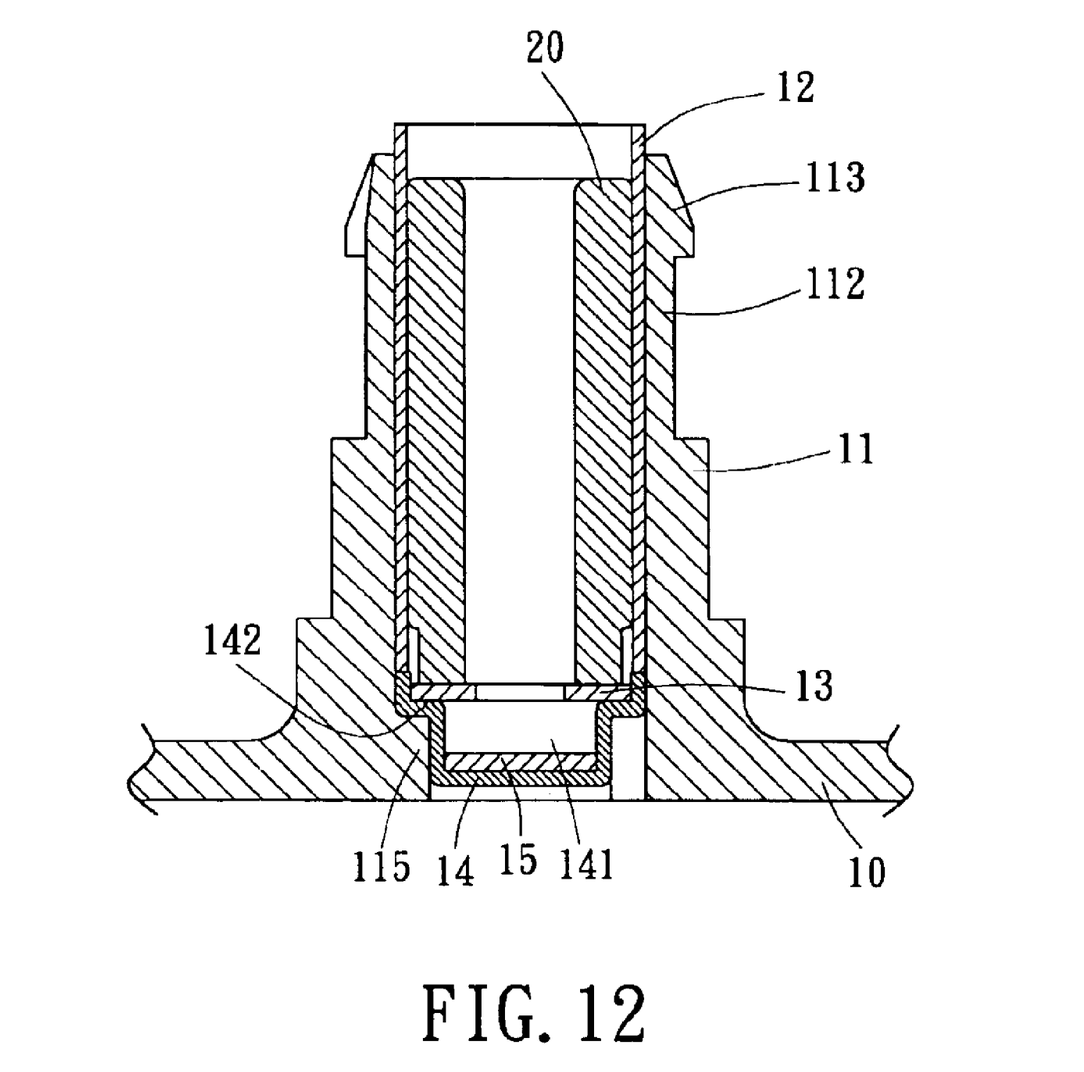
FIG. 12 is a sectional view of the third embodiment of the axial tube assembly for a motor in accordance with the present invention.

FIGS. 11 and 12 illustrate a third embodiment of the invention, wherein the inner flange 120 of the sleeve 12 is omitted to simplify the structure of the sleeve 12. As illustrated in FIG. 12, the positioning ring 13, the supporting member 14, and the abrasion-resisting plate 15 are reliably sandwiched between the bottom end (not labeled) of the sleeve 12 and the protrusions 115 of the axial tube 11 by means of choosing a bearing 20 with an appropriate specification.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. An axial tube assembly for a motor, comprising:

an axial tube adapted to be securely mounted to a casing, with a stator being adapted to be mounted to the axial tube, the axial tube including a plurality of longitudinal slits in an upper end thereof, thereby forming a plurality of resilient tabs; and a sleeve mounted in the axial tube;

wherein when a bearing is mounted in the sleeve, the sleeve is tightly engaged with the axial tube such that the axial tube and the bearing exert forces on each other to thereby retain the axial tube and the bearing in place.

2. The axial tube assembly as claimed in claim 1, wherein each said resilient tab has a hook on an outer side thereof.

3. A motor comprising:

a casing including a hollow tube;

an axial tube securely mounted to the casing, the axial tube further being mounted in the hollow tube;

a stator mounted to the axial tube;

a sleeve mounted in the axial tube; and a bearing mounted in the sleeve;

the sleeve being tightly engaged with the axial tube such that the axial tube and the bearing exert forces on each other to thereby retain the axial tube and the bearing in place.

4. The motor as claimed in claim 3, wherein the axial tube includes a plurality of engaging blocks on a lower end of an outer periphery thereof, the hollow tube of the casing including a plurality of engaging grooves in a lower end thereof for respectively and securely receiving the engaging blocks of the axial tube, thereby preventing the axial tube from rotating relative to the casing.

5. The motor as claimed in claim 3, wherein the axial tube is integrally formed on the casing as a single member.

6. The motor as claimed in claim 3, wherein the axial tube includes a plurality of longitudinal slits in an upper end thereof, thereby forming a plurality of resilient tabs.

7. The motor as claimed in claim 6, wherein each said resilient tab has a hook on an outer side thereof for retaining the stator in place.

8. The motor as claimed in claim 3, further including a rotor having a shaft rotatably received in the bearing.

9. The motor as claimed in claim 8, wherein the rotor includes a hub to which an end of the shaft is securely mounted, the sleeve including an upper end in a position adjacent to the hub, preventing dust from entering the bearing.

10. The motor as claimed in claim 8, wherein the axial tube includes a plurality of protrusions formed on an inner periphery thereof, further including a positioning ring sandwiched between the protrusions of the axial sleeve and a bottom end of the sleeve, with the shaft being rotatably held by the positioning ring.

11. The motor as claimed in claim 10, wherein the sleeve includes an inner flange on an inner periphery thereof, with the positioning ring being sandwiched between the protrusions of the axial sleeve and the inner flange of the sleeve.

12. The motor as claimed in claim 10, further including a supporting member having a stepped portion sandwiched between a bottom end of the sleeve and the protrusions of the axial tube, the shaft having a distal end resting on another portion of the supporting member.

13. The motor as claimed in claim 12, wherein the supporting member includes a compartment for receiving an abrasion-resisting plate on which the distal end of the shaft rests.

14. The motor as claimed in claim 13, further including lubricating oil received in the compartment of the supporting member.

15. The motor as claimed in claim 3, wherein the axial tube includes a plurality of protrusions formed on an inner periphery thereof, further including a supporting member having a portion sandwiched between a bottom end of the sleeve and the protrusions of the axial tube, further including a rotor having a shaft rotatably received in the bearing, the shaft having a distal end resting on another portion of the supporting member.

16. The motor as claimed in claim 15, wherein the supporting member includes a compartment for receiving an abrasion-resistant plate on which the distal end of the shaft rests.

17. The motor as claimed in claim 16, further including lubricating oil received in the compartment of the supporting member.

18. The motor as claimed in claim 3, wherein the bearing is one of an oil bearing, a self-lubricating bearing, a copper bearing, and a sintered bearing.

* * * * *